United States Patent
Biegert et al.

(10) Patent No.: US 8,428,465 B2
(45) Date of Patent: Apr. 23, 2013

(54) RETURN PATH FOR USPSTREAM COMMUNICATIONS ORIGINATING FROM OPTICAL NODE

(75) Inventors: Mark R. Biegert, Maple Grove, MN (US); Peter Lee, Rogers, MN (US)

(73) Assignee: Calix, Inc., Petaluma, CA (US)

( * ) Notice: Subject to any disclaimer, the term of this patent is extended or adjusted under 35 U.S.C. 154(b) by 601 days.

(21) Appl. No.: 12/260,690

(22) Filed: Oct. 29, 2008

(65) Prior Publication Data

US 2010/0104287 A1    Apr. 29, 2010

(51) Int. Cl.
*H04B 10/00* (2006.01)
*H04B 10/08* (2006.01)

(52) U.S. Cl.
USPC ............ 398/116; 398/33; 398/32; 398/25; 398/58; 398/63; 398/66; 398/67; 398/115

(58) Field of Classification Search ........... 398/9, 25, 398/32, 33, 58–72, 76, 98, 100, 140, 177, 398/181
See application file for complete search history.

(56) References Cited

U.S. PATENT DOCUMENTS

| | | | |
|---|---|---|---|
| 3,633,169 A | | 1/1972 | Bickford |
| 5,323,255 A | * | 6/1994 | Sierens et al. ............ 398/98 |
| 5,339,184 A | * | 8/1994 | Tang ....................... 398/116 |
| 5,687,222 A | | 11/1997 | McLaughlin et al. |
| 5,885,225 A | | 3/1999 | Keefe et al. |
| 6,460,182 B1 | | 10/2002 | BuAbboud |
| 6,751,271 B2 | | 6/2004 | Kien et al. |
| 6,925,219 B2 | * | 8/2005 | Pfeiffer .................... 385/16 |
| 7,146,104 B2 | | 12/2006 | Farmer |
| 7,184,664 B2 | | 2/2007 | Farmer et al. |
| 7,190,901 B2 | | 3/2007 | Farmer et al. |
| 7,218,855 B2 | | 5/2007 | Whittlesey et al. |
| 7,620,325 B2 | * | 11/2009 | Mizutani et al. ........... 398/100 |
| 2001/0001620 A1 | | 5/2001 | Lee |
| 2002/0027687 A1 | * | 3/2002 | Horlyck .................... 359/134 |
| 2004/0223759 A1 | * | 11/2004 | Fee ......................... 398/33 |
| 2005/0129402 A1 | * | 6/2005 | Kim et al. ................. 398/79 |
| 2005/0272395 A1 | | 12/2005 | Sorrells et al. |
| 2006/0056843 A1 | * | 3/2006 | Fee et al. .................. 398/19 |
| 2006/0192434 A1 | * | 8/2006 | Vrla et al. ................. 307/64 |
| 2006/0222365 A1 | * | 10/2006 | Jung et al. ................ 398/72 |
| 2007/0019959 A1 | | 1/2007 | Retnasothie et al. |
| 2007/0047957 A1 | * | 3/2007 | Iio et al. .................. 398/59 |
| 2007/0140696 A1 | * | 6/2007 | DeCusatis et al. .......... 398/98 |
| 2008/0131114 A1 | * | 6/2008 | Jang et al. ................ 398/13 |
| 2008/0205900 A1 | * | 8/2008 | Cole et al. ................ 398/153 |

(Continued)

OTHER PUBLICATIONS

Emmendorfer: "RFoGG for Business Services", Jan. 1, 2008, http://www.cable360.net/technology/strategy/RFoG-for-Business-Services_27351.html, 11 pages.*

(Continued)

*Primary Examiner* — Li Liu
(74) *Attorney, Agent, or Firm* — Shumaker & Sieffert, P.A.

(57) ABSTRACT

This disclosure describes techniques for providing a communication path for upstream communications originating from a node of an optical network. In particular, methods and devices are described for combining upstream communications originating from the node of the optical network with upstream communications originating from subscriber devices coupled to the node. The upstream communication originating from the node may, for example, include status information about the node. The upstream communication, which may include status information about the node, essentially piggy-backs onto upstream communication originating from the subscriber devices coupled to the node.

39 Claims, 5 Drawing Sheets

U.S. PATENT DOCUMENTS

| | | | |
|---|---|---|---|
| 2008/0209489 | A1 | 8/2008 | Joyce et al. |
| 2008/0310842 | A1 | 12/2008 | Skrobko |
| 2009/0059900 | A1* | 3/2009 | Abraham ...................... 370/352 |
| 2009/0060520 | A1* | 3/2009 | Cole et al. ..................... 398/140 |
| 2009/0067840 | A1 | 3/2009 | Bernard et al. |
| 2010/0028002 | A1 | 2/2010 | Qian et al. |
| 2010/0083330 | A1 | 4/2010 | Bernstein et al. |

OTHER PUBLICATIONS

Motorola: "Leveraging RFoG to Deliver DOCSIS and GPON Services Over Fiber", Motorola Whitepaper, Sep. 2008, pp. 1-9.*

Digital Broadband Delivery System: Out of Band Transport Part 1: Mode A, American National Standard, Society of Cable Telecommunications Engineers, ANSI/SCTE 55-1 (formerly DVS 178), 2002, 49 pages.

Digital Broadband Delivery System: Out of Band Transport Part 2: Mode B, American National Standard, Society of Cable Telecommunications Engineers, ANSI/SCTE 55-2 (formerly DVS 167), 2002, 76 pages.

U.S. Patent Application entitled "Return Path Compliance in Networks", U.S. Appl. No. 12/260,665, filed Oct. 29, 2008.

Data-Over-Cable Service Interface Specifications, Cable Modem to Customer Premise Equipment Interface Specification, CM-SP-CMCIv3.0-I01-080320, Mar. 20, 2008, 19 pages.

Data-Over-Cable Service Interface Specifications DOCSIS 3.0, Security Specification, CM-SP-SECv3.0-I08-080522, May 22, 2008, 761 pages.

Data Over Cable Service Interface Specifications DOCSIS 3.0, Physical Layer Specification, CM-SP-PHYv3.0-I07-080522, May 22, 2008, 807 pages.

Data-Over-Cable Service Interface Specifications DOCSIS 3.0, Operations Support System Interface Specification, CM-SP-0SSIv3.0-I07-080522, May 22, 2008, 170 pages.

Data-Over-Cable Service Interface Specifications DOCSIS 3.0, MAC and Upper Layer Protocols Interface Specification, CM-SP-MULPIv3.0-I08-080522, May 22, 2008, 225 pages.

Office action for U.S. Appl. No. 12/260,665, mailed Aug. 2, 2011, 13 pages.

Response to office action for U.S. Appl. No. 12/260,665, filed Nov. 2, 2011, 15 pages.

Response to office action for U.S. Appl. No. 12/260,665, filed Apr. 3, 2012, 19 pages.

Office action for U.S. Appl. No. 12/260,665, mailed Jan. 3, 2012, 18 pages.

Request for continued examination and response to final office action for U.S. Appl. No. 12/260,665, filed Oct. 8, 2012, 27 pages.

Response to final office action for U.S. Appl. No. 12/260,665, filed Aug. 6, 2012, 22 pages.

Final Office Action for U.S. Appl. No. 12/260,665, mailed Jun. 6, 2012, 15 pages.

* cited by examiner

US 8,428,465 B2

RETURN PATH FOR USPSTREAM COMMUNICATIONS ORIGINATING FROM OPTICAL NODE

TECHNICAL FIELD

This disclosure relates to optical networks and, more particularly, the transport of upstream communications from nodes of an optical network.

BACKGROUND

A cable network typically includes at least one headend system that services a plurality of subscriber devices. Generally, the headend system is stored within a central office of a cable service provider and includes one or more cable modem termination systems (CMTSs) and conditional access servers (CASs) that access a backbone network (such as the Internet). Each of the CMTSs and CASs may service customer premise equipment (CPE), such as cable modems (CMs) and set-top boxes (STBs). Traditionally, the cable network includes coaxial cable that is laid up to and installed inside a subscriber's premises to couple the CMTSs and CASs of the headend system to the CPE (which may also be referred to as "subscriber devices"). Over this coaxial cable the CMTSs, CASs, and subscriber devices communicate via radio frequency (RF) signals, which consists of modulated analog and digital signals.

While coaxial cable provides sufficient bandwidth to transmit television and low-speed Internet services, the recent growth of the Internet and desire to provide high-speed Internet access via the cable network has begun to generate new bandwidth concerns. In response to these concerns, most cable service providers have upgraded links coupling the headend system to the backbone network from coaxial cable to higher bandwidth fiber optical cable to facilitate higher bandwidth access to the backbone network, creating what may be referred to as a "hybrid fiber coaxial network" or "HFC network."

Some cable service providers also have begun to upgrade the coaxial cable extending from the CMTSs and/or CASs to the subscriber premises but most have not, as of yet, extended the fiber optical cable all the way, or the "last mile," to the subscriber's premises. Recently, cable service providers have begun to consider upgrading this last mile to fiber optic cable to offer a service known as fiber-to-the-home (FTTH) or fiber to the premises (FTTP). In this all-fiber network, all communications typically occur via a baseband digital protocol, such as the gigabyte passive optical network (GPON).

Although all-fiber networks may offer relatively higher transmission speeds and bandwidth when compared to HFC networks, upgrading to an all-fiber network may require large upfront expenditures. To support communications via baseband digital protocols, upgrading the last mile may require replacing not only the coaxial cable to the customer premises but also the CMTSs, CASs, any CPE or subscriber devices, and the coaxial cable installed within the subscriber's premises. As a result, an intermediate upgrade strategy has been proposed where RF signals are converted at the headend to optical signals and transmitted over fiber optic links, which are made of glass and cannot directly transport electrical signals. The electrical signals from the subscriber equipment may be used to modulate light generating devices, such as lasers, thereby converting the RF signal to an optical signal. Using RF-modulated light allows fiber optic cables to carry the same RF signals as coaxial cable. At the CPE or subscriber devices, the optical signals may be converted back to RF signals, e.g., using a photodiode. The resulting network may be referred to as an RF Over Glass (RFOG) network.

As an RFOG network simply converts the RF signals to a form that can be transported over optical fiber and converted back to RF at the central office, the cable service provider can continue to use his RF infrastructure at the central office and the home. The cable service provider does not need to upgrade the CMTS, CASs, CPE or subscriber devices, and coaxial cable located within the subscriber's premises, thereby substantially reducing upfront costs required when compared to upgrading directly to the all-fiber network. Instead, the cable service provider may lay fiber optic cable to the subscriber's premises, implement the required electrical-to-optical (E-to-O) and optical-to-electrical (O-to-E) converters at the ends of the fiber optic cable, and at some later time, when the service provider has sufficient capital, convert the RFOG network to a dedicated optical network that communicates using a baseband digital protocol, such as a GPON, active Ethernet or other optical network transport.

SUMMARY

This disclosure describes techniques for providing a communication path for upstream communications originating from a node of an optical network. In particular, methods and devices are described for combining upstream communications originating from the node of the optical network with upstream communications originating from subscriber devices coupled to the node. The upstream communication originating from the node may, for example, include status information about the node. The upstream communications that include status information about the node essentially piggy-back onto upstream communications originating from subscriber devices.

In one example, a method includes receiving, with a node of an optical network, a first upstream communication originating from a subscriber device coupled to the node, combining the upstream communication received from the subscriber device with a second upstream communication originating from the node to generate a combined upstream communication, and transmitting the combined upstream communication as an upstream optical signal via a fiber optical cable.

In another example, a device of an optical network comprises a signal combiner that combines an upstream communication received from a subscriber device to which the device is coupled with a second upstream communication originating from the device to generate a combined upstream communication and a laser that transmits the combined upstream communication as an upstream optical signal via a fiber optical cable.

In another example, a device comprises means for receiving a first upstream communication originating from a subscriber device coupled to the node, means for combining the upstream communication received from the subscriber device with a second upstream communication originating from the device to generate a combined upstream communication, and means for transmitting the combined upstream communication as an upstream optical signal via a fiber optical cable.

In another example, a computer-readable medium comprising instructions that cause a programmable processor to receive, with a node of an optical network, a first upstream communication originating from a subscriber device coupled to the node, combine the upstream communication received from the subscriber device with a second upstream communication originating from the node to generate a combined upstream communication, and transmit the combined upstream communication as an upstream optical signal via a fiber optical cable.

The details of one or more examples are set forth in the accompanying drawings and the description below. Other features, objects, and advantages of the techniques of this disclosure will be apparent from the description and drawings, and from the claims.

DETAILED DESCRIPTION

Figure 1:
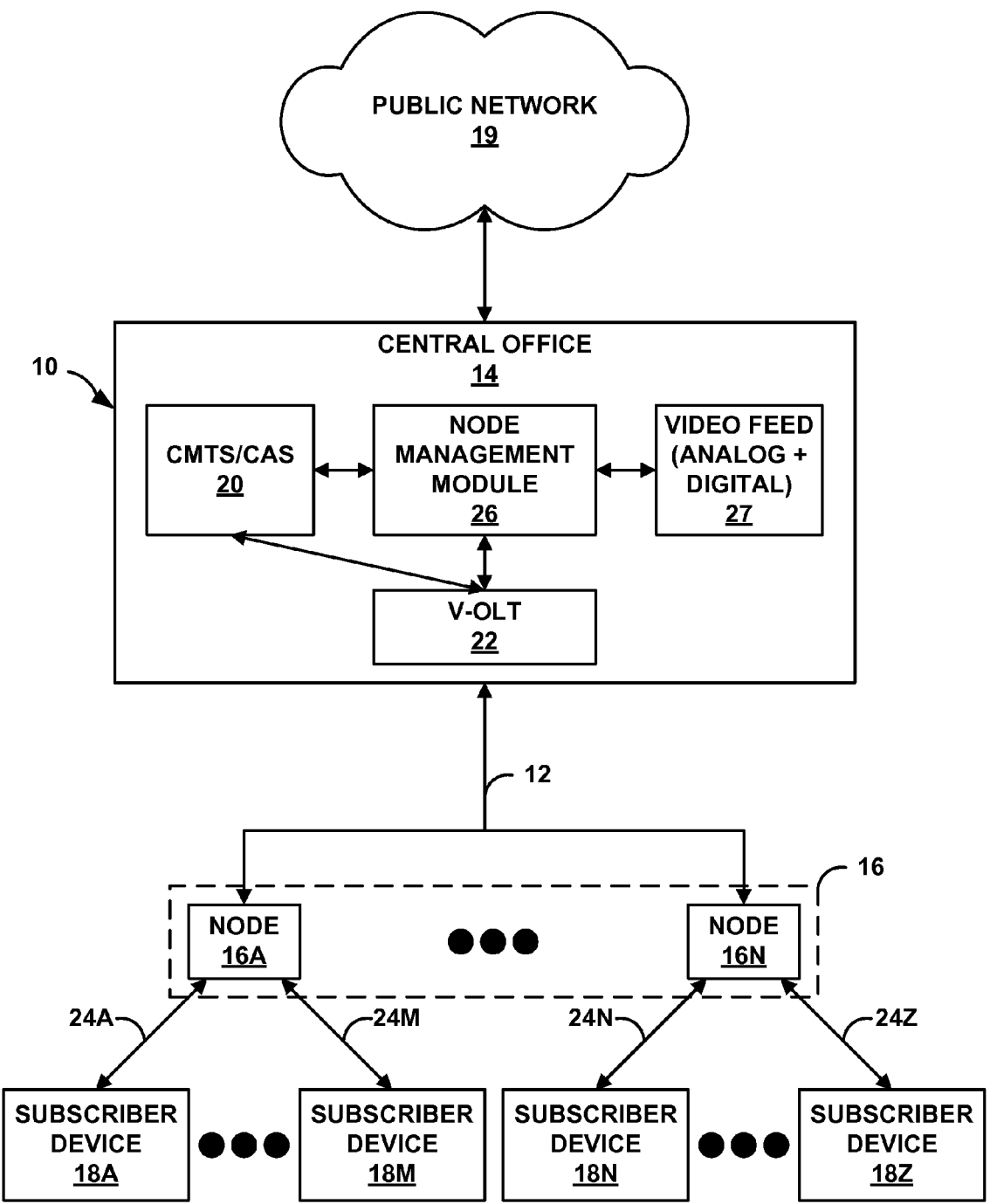
FIG. 1 is a block diagram illustrating a portion of an example Radio Frequency Over Glass (RFOG) network.

FIG. 1 is a block diagram illustrating a portion of an example RFOG network 10. RFOG network 10 includes one or more fiber optical cables 12 (sometimes referred to as fiber optical links) over which radio frequency (RF) signals may be transmitted as optical signals. The RF signals may comprise electrical analog signals, which may be converted from electrical signals to optical signals for transmission over fiber optical cables 12. The optical signals, which retain the data of the electrical analog signals, may be transmitted as light via fiber optical cables 12. RFOG network 10 is one example of an RFOG network, and should not be considered limiting of this disclosure.

In the example of FIG. 1, RFOG network 10 includes a central office 14 coupled to a plurality of nodes 16A-16N ("nodes 16"). Central office 14 may support delivery of voice, data and/or video services to nodes 16. Central office 14 may represent a structure, building, or other area for housing one or more headend systems and/or service provider equipment. Central office 14 may be owned by a network service provider that provides access to one or more networks via RF communications or signals. Central office 14 may convert the RF signals to corresponding optical signals and transmit the optical signals to nodes 16. In one example, central office 14 may house a headend system, e.g., Cable Modem Termination System/Conditional Access System 20 ("CMTS/CAS 20"), for a cable company or enterprise that provides access to one or more services, such as a public network (e.g., the Internet), television content or channels, the public switched telephone network (PSTN), and Voice over Internet Protocol (VoIP). In the example of FIG. 1, central office 14 connects to public network 19, but in other instances, central office 14 may connect to any type of network that provides one or more of these services, where the connection occurs via a fiber optical cable or link, satellite, or any other type of wired or wireless communication medium.

Nodes 16 may receive the optical signals from central office 14 and convert those optical signals back into RF signals for delivery to subscriber devices 18A-18Z ("subscriber devices 18"). Subscriber devices 18 may include modems, set-top boxes, televisions, telephones, computers, network appliances, or any other device, component or module that ultimately receive the services delivered via the optical network. As such, nodes 16 may refer to devices, components or modules whose function includes converting electrical signals to optical signals and optical signals to electrical signals for RF communications for one or more customer sites. The presence of nodes 16 on optical network 10 is typically transparent to both the CMTS/CAS 20 and subscriber devices 18. In other words, CMTS/CAS 20 and subscriber devices 18 are unaware of the conversion performed by nodes 16.

In one embodiment, at least a portion of nodes 16 may comprise "micronodes" that each converts electrical signals to optical signals and optical signals to electrical signals for RF communications at a single customer site, which may include one or more subscriber devices 18. In other embodiments, nodes 16 (or a portion of nodes 16) may provide similar capabilities to more than one customer site. For example, at least a portion of nodes 16 may be "full nodes" that provide optical-to-electrical ("O-to-E") and electrical-to-optical ("E-to-O") conversion for a large group of customer sites (e.g. 250 customer sites) or "mininodes" that provide O-to-E and E-to-O conversion for a small group of customer sites (e.g. 10 customer sites). As such, nodes 16 may comprise any combination of full nodes, mininodes or micronodes to perform the above described conversions. The above number of customer sites serviced by full nodes, mininodes and micronodes are provided as an example to illustrate capabilities of exemplary nodes 16. In other instances, nodes 16 may service more or less customer sites and, as a result, more or less subscriber devices 18.

In the example illustrated in FIG. 1, central office 14 includes an exemplary cable headend system CMTS/CAS 20 that interfaces with public network 19 to provide access to one or more of the above described services. CMTS/CAS 20 may, for example, translate RF signals into packets, cells, or other network data units for transmission upstream to public network 19 and translate packets, cells, or other network data units received from public network 19 into RF signals for transmission downstream to subscriber devices 18. The translation may involve converting the analog RF signals into digital signals and then packetizing portions of the digital signal. That is, the digital signal may be segmented into discrete portions and each portion may be transmitted in a payload of a packet. CMTS/CAS 20 therefore may represent a network device or controller that controls the flow of RF communications within the cable network, which in this instance includes RFOG network 10.

To enable the communication of RF signals over fiber optical cables 12, central office 14 further includes a video optical line terminal 22 ("V-OLT 22"). V-OLT 22 may include hardware and/or software necessary to transparently convert RF signals to optical signals and optical signals to RF signals. V-OLT 22 may include an E-to-O converter (e.g. laser driver and/or laser) for communicating optical signals downstream to nodes 16. In particular, the E-to-O converter converts RF communications, which are electric signals, received from CMTS/CAS 20 and video feed 27 to optical signals for transmission downstream over fiber optical cable 12. Video feed 27 may output analog and/or digital video. V-OLT 22 may also include an O-to-E converter (e.g. photodiode) for receiving upstream optical signals from nodes 16. The O-to-E converter may convert upstream optical signals received via fiber optical cable 12 to upstream RF signals, which are electric signals, for delivery to CMTS/CAS 20. As described above, the conversion of the optical signals to RF signals and conversion of RF signals to optical signals may be "transparent," in that CMTS/CAS 20 may be unaware of the conversion the signals.

While shown as including a single V-OLT 22, central office 14 may include a plurality of V-OLTs 22 that each services a group of nodes 16. Each of nodes 16 services a subset of subscriber devices 18. In the example illustrated in FIG. 1, node 16A services subscriber devices 18A-18M and node 16B services subscriber devices 18N-18Z. Subscriber devices 18 serviced by the respective nodes 16 may be located within a single customer site or within multiple customer sites. As such, each of nodes 16 may, in some instances, service multiple customer sites that each includes one or more subscriber devices 18.

CMTS/CAS 20 may, in some instances, service up to 4000 subscriber devices 18 while V-OLT 22 may service up to 64 nodes 16. Assuming each of nodes 16 services, at most, 10 subscriber devices 18, V-OLT 22 may therefore only service 640 subscriber devices 18. The above numbers, e.g., 4000, 640 and 10, are provided as an example to illustrate capabilities of exemplary CMTS/CAS 20, V-OLT 22, and nodes 16. In other instances, nodes 16 may service more or less subscriber devices and, as a result, V-OLTs 22 may service more or less subscriber devices 18. Therefore, central office 14 may include a plurality of V-OLTs 22 for each CMTS/CAS 20. However, for ease of illustration, only a single V-OLT 22 is shown in FIG. 1. Therefore, the techniques of this disclosure should not be limited to this exemplary embodiment.

CMTS/CAS 20 may also be responsible for controlling RF communications sent from subscriber devices 18 to CMTS/CAS 20 (so-called "upstream" communications). CMTS/CAS 20 may control the times at which subscriber devices 18 are allowed to send upstream RF communications. In one embodiment, CMTS/CAS 20 may designate certain timeslots during which upstream RF communications are to occur. For example, CMTS/CAS 20 may assign upstream timeslots during which subscriber devices 18 may send upstream RF communications using a process often referred to as "ranging." Ranging typically involves CMTS/CAS 20 transmitting an RF ranging signal, in turn, to each of subscriber devices 18 and measuring the time it takes each of subscriber devices 18 to respond to the RF ranging signal. Based on this measured time, CMTS/CAS 20 may calculate an approximate distance each of subscriber devices 18 lies from CMTS/CAS 20 and determine a timeslot during which each of subscriber devices 18 may communicate upstream data to ensure that transmissions arrive at the CMTS/CAS 20 in the proper time sequence and that transmissions from the subscriber devices 18 do not interfere with one another.

In another embodiment, CMTS/CAS 20 may control the times at which subscriber devices 18 are allowed to send upstream RF communications using a command/response protocol. In the command/response protocol, subscriber devices 18 may only send upstream RF communications in response to a command from the CMTS/CAS 20 designed to elicit a response from subscriber devices. In this manner, CMTS/CAS 20 may control the times at which subscriber devices 18 are allowed to send upstream RF communications to avoid collisions on fiber optical cables 12. Although two example upstream RF control mechanisms are described above, CMTS/CAS 20 may control the times at which subscriber devices 18 send upstream RF communications using any other techniques. Thus, the ranging and command/response techniques should not be considered limiting of the techniques as described in this disclosure.

Subscriber devices 18 send upstream RF communications, e.g., during a timeslot assigned by CMTS/CAS 20 or in response to a command received from CMTS/CAS 20. Upstream RF communications may refer to upstream communications from applications, such as cable set-top boxes, Internet browsers, and other Internet or cable system-related applications. The upstream RF communications may comprise administrative communications, control communications, configuration commands, status communications or any other RF communications transmitted in the upstream direction. For example, a cable set-top box or modem may send upstream communications that include status information associated with the set-top box or modem or include information regarding services ordered or used by the subscriber.

Each of nodes 16 may include hardware and/or software to convert the upstream electrical communications, e.g., RF signals, received from subscriber devices 18 into upstream optical signals for delivery to central office 14 via fiber optical cable 12. Each of nodes 16 may, for example, include an E-to-O converter (e.g., laser) to convert upstream RF signals received from subscriber devices 18 via respective electrical cables 24 to optical signals for delivery upstream to central office 14. Each of nodes 16 may also include hardware and/or software to convert downstream optical signals received from central office 14 into downstream electrical communications, e.g., RF signals, for delivery to subscriber devices 18. Each of nodes 16 may, for example, include an O-to-E converter (e.g., photodiode) to convert downstream optical signals received via fiber optical cable 12 to RF signals for delivery via a respective one of electrical cables 24A-24Z ("electrical cables 24") to subscriber devices 18. As such, nodes 16 may represent an intermediate network device capable of converting optical signals to electrical signals and electrical signals to optical signals. As described above, such conversions may be "transparent" from the perspective of subscriber devices 18 in that subscriber devices 18 may be unaware of the conversion. CMTS/CAS 20 and subscriber devices 18 may therefore be unaware of the intermediate conversion of RF communications or signals to optical signals. Thus, CMTS/CAS 20 and subscriber devices 18 typically need not take any additional action or perform any additional steps to communicate in an RFOG network, such as RFOG network 10.

Because nodes 16 are typically designed to be transparent to both central office 14 and subscriber devices 18, central office 14 does not provide any communication path for upstream communications originating from nodes 16. In other words, nodes 16 simply convert and pass upstream communications originating from subscriber devices 18 (e.g., set-top boxes or cable modems) to central office 14. As such, conventional RFOG networks have no mechanism by which nodes 16 may send upstream communications originating from nodes 16 and including status information about nodes 16 to central office 14. Likewise, there is no mechanism for transmitting downstream communications directed to nodes 16 as a final destination. With no mechanism by which nodes 16 communicate status information with central office 14, nodes 16 may not be actively monitored and/or maintained. For example, central office 14 may not determine a status of hardware components of nodes 16, e.g., a power supply or laser driver, performance information of nodes 16, e.g., RF power levels or optical power levels, node self-test information, and the like. Without this information, system availability is reduced and all maintenance actions require on-site visits by maintenance personnel, which is expensive.

In accordance with the techniques of this disclosure, however, a return path is provided for sending upstream communications originating from nodes 16. In accordance with the techniques described in this disclosure, nodes 16 combine the upstream communications originating from subscriber devices 18 with upstream communications originating from nodes 16, and transmit the combined upstream signal via fiber optical cables 12. In this manner, nodes 16 may be viewed as piggy-backing upstream communications, e.g., communications that include status information about nodes 16, over the return path used for transmitting upstream RF communications originating from subscriber devices 18. In other words, nodes 16 may only transmit upstream communications that include status information about nodes 16 when one of the subscriber devices 18 to which the respective nodes are coupled transmit upstream communications. In this manner, nodes 16, by virtue of piggy-backing upstream communication on the return path utilized by subscriber devices 18, may be controlled to communicate upstream communications during a particular timeslot assigned to subscriber device 18 to which nodes 16 are coupled or in response to a command packet received from CMTS/CAS 20 to the transmitting one of subscriber devices 18 and designed to elicit a response from the transmitting one of subscriber devices 18.

At central office 14, V-OLT 22 receives the upstream optical signal and converts the upstream optical signal to an upstream electrical signal, e.g., RF signal, that includes the combined upstream communications from subscriber devices 18 and nodes 16. Central office 12 may include hardware, such as a diplexer (not shown), to separate the upstream electrical signal into the upstream signal originating from one of subscriber devices 18 and the upstream signal originating from one of nodes 16. The upstream communications originating from nodes 16 may, for example, be in a different frequency band than the communications originating from subscriber devices 18 such that they may be separated at central office 14. The diplexer provides the upstream signal originating from the subscriber device 18 to CMTS/CAS 20 and provides the upstream signal originating from node 16 to a node management module 26.

Node management module 26 may use the status information included in the upstream communications originating from nodes 16 to monitor and/or actively manage nodes 16. As described above, the status information may include a status of hardware components of nodes 16, e.g., a power supply or laser driver, performance information of nodes 16, e.g., RF power levels or optical power levels, node self-test information, and the like. Node management module 26 may, for example, monitor the status of the backup power supply or laser driver of nodes 16 and notify an network administrator when the backup power supply or the laser driver need to be replaced. As another example, node management module 26 may monitor the performance of nodes 16 based on the RF and optical power levels and alert the network administrator when the performance of one of nodes 16 falls below a desired performance level.

In some instances, node management module 26 may indirectly control upstream communications from nodes 16. For example, node management module 26 may invoke CMTS/CAS 20 to send a command requesting status information from subscriber devices 18, so that nodes 16 may piggy-back upstream communications onto the return path of subscriber devices 18. In this manner, node management module 26 and CMTS/CAS 20 may be capable of communicating with one another.

In general, due in part to the transparent nature of the network, RFOG network 10 may provide a number of benefits to the network service provider, e.g., the cable service provider company in this instance. One possible benefit of RFOG network 10 is that the transition and costs associated with the transition, from an RF network to a full optical network, such as to a Gigabyte Passive Optical Network (GPON), may occur, and accrue, gradually over time, respectively. That is, the cable company or other service provider may expend capital to upgrade a traditional RF network first to RFOG network 10 and then, when, for example, demand for high-speed access to the above described services increases in certain areas of the network and bandwidth limitations become a pressing concern or when sufficient capital exists, expend this additional capital to upgrade RFOG network 10 to a full optical network.

To upgrade a conventional RF network to RFOG network 10, the cable company or network service provider may lay fiber optical cable 12 between central office 14 and subscriber premises, e.g., a subscriber's home or place of business in which one or more of subscriber devices 18 reside. Fiber optical cable 12 may be laid alongside cables that carry electrical RF signals, e.g., coaxial cable. At some later point, the cable company may purchase V-OLT 22 and nodes 16 and install V-OLT 22 in central office 14 and nodes 16 at respective subscriber's premises. The cable company may then begin using the fiber optical cable 12 to transmit RF signals, as described above. This upgrade may therefore occur over time and delay the initial upfront costs associated with upgrading directly from an RF network to a full optical network. By delaying the expenditure of capital, the upgrade may be more manageably achieved by those cable companies or other network service providers that lack the necessary capital to upgrade directly to a full optical network.

Additionally, RFOG network 10 enables the continued use of conventional RF customer premise equipment (CPE) and a conventional CMTS/CAS. CPE is shown in FIG. 1 as subscriber devices 18. Subscriber devices 18 (or CPE) may each comprise set-top boxes (STBs) typically located near or proximate to a subscriber's television or other viewing device. Subscriber devices 18 may also each comprise a cable modem or any other device used to communicate via RF signals with a CMTS, such as CMTS/CAS 20. Upgrading directly to a full optical network normally entails upgrading the CPE or subscriber devices 18 (and possibly the CMTS) to devices capable of communicating according to a baseband digital protocol such as GPON, Ethernet PON, or any other network packet- or cell-based protocol. This upgrade typically requires upgrading hundreds, if not thousands, of subscriber devices 18, which may prove prohibitively costly for cable companies or service providers having less capital on hand. However, by converting to an intermediary RFOG network, such as RFOG network 10, the cable company or service provider may delay upgrading subscriber devices 18, as RFOG network 10 continues to communicate using RF signals and not packets. As a result of not having to upgrade subscriber devices 18, RFOG network 10, as described above, may make the conversion to a full optical network more incremental and more manageable for those companies or service providers who would like to defer capital expenditures. The existing RF infrastructure also includes extensive software support for program selection and bill collection. RFOG allows these systems to continue to be used unmodified. This gives the service providers time to upgrade their software infrastructure to support the IP-based fiber optic infrastructure that will eventually replace the RFOG system.

CMTS/CAS 20 and at least a portion of subscriber devices 18 may operate in accordance with applicable cable network standards set forth by the Digital Video Subcommittee (DVS) of the Society of Cable Telecommunications Engineers (SCTE) working in conjunction with the American National Standards Institute (ANSI), such as ANSI/SCTE 55-1 (formerly DVS 178) and ANSI/SCTE 55-2 (formerly DVS 167). More information regarding these RFOG-supported standards can be found in ANSI/SCTE 55-1 and 55-2, titled "Digital Broadband Delivery System: Out of Band Transport Part 1: Mode A" and "Digital Broadband Delivery System: Out of Band Transport Part 2: Mode B," each prepared by the DVS of the ANSI/SCTE, each dated 2002, both of which are herein incorporated by reference. CMTS/CAS 20 and at least a portion of subscriber devices 18 may alternatively operate in accordance with standards governing hybrid fiber coaxial (HFC), such as Data Over Cable Service Interface Specification (DOCSIS) 3.0. More information regarding the DOCSIS 3.0 standard can be found in a number of DOCSIS 3.0 specifications each designated as follows: "SP-SECv3.0," "SP-CMCv3.0," "SP-PHYv3.0," "SP-MULPIv3.0," and "SP-OSSIv3.0," each respectively titled as follows: "Security Specification," "Cable Modem to Customer Premise Equipment Interface Specification," "Physical Layer Specification, ". "MAC and Upper Layer Protocols Interface Specification," and "Operations Support System Interface Specification," each published on May 22, 2008, and each of which is also incorporated herein by reference.

In the example embodiment illustrated in FIG. 1, nodes 16 (e.g., full nodes, mininodes, micronodes) are described as performing only O-to-E and E-to-O conversion for RF communications between CMTS/CAS 20 and Video Feed 27 and subscriber devices 18. Nodes 16 may comprise Optical Network Terminals that incorporate nodes 16. ONTs may also, in addition to the RF conversion described herein, support other optical network architectures or optical protocols, such as Passive Optical Network (PON) or Active Ethernet architectures. As such, a node, mininode or micronode may be independent of an ONT or included within an ONT. Therefore, the techniques described in this disclosure with respect to nodes 16 may be implemented by other devices, such as an ONT.

Figure 2:
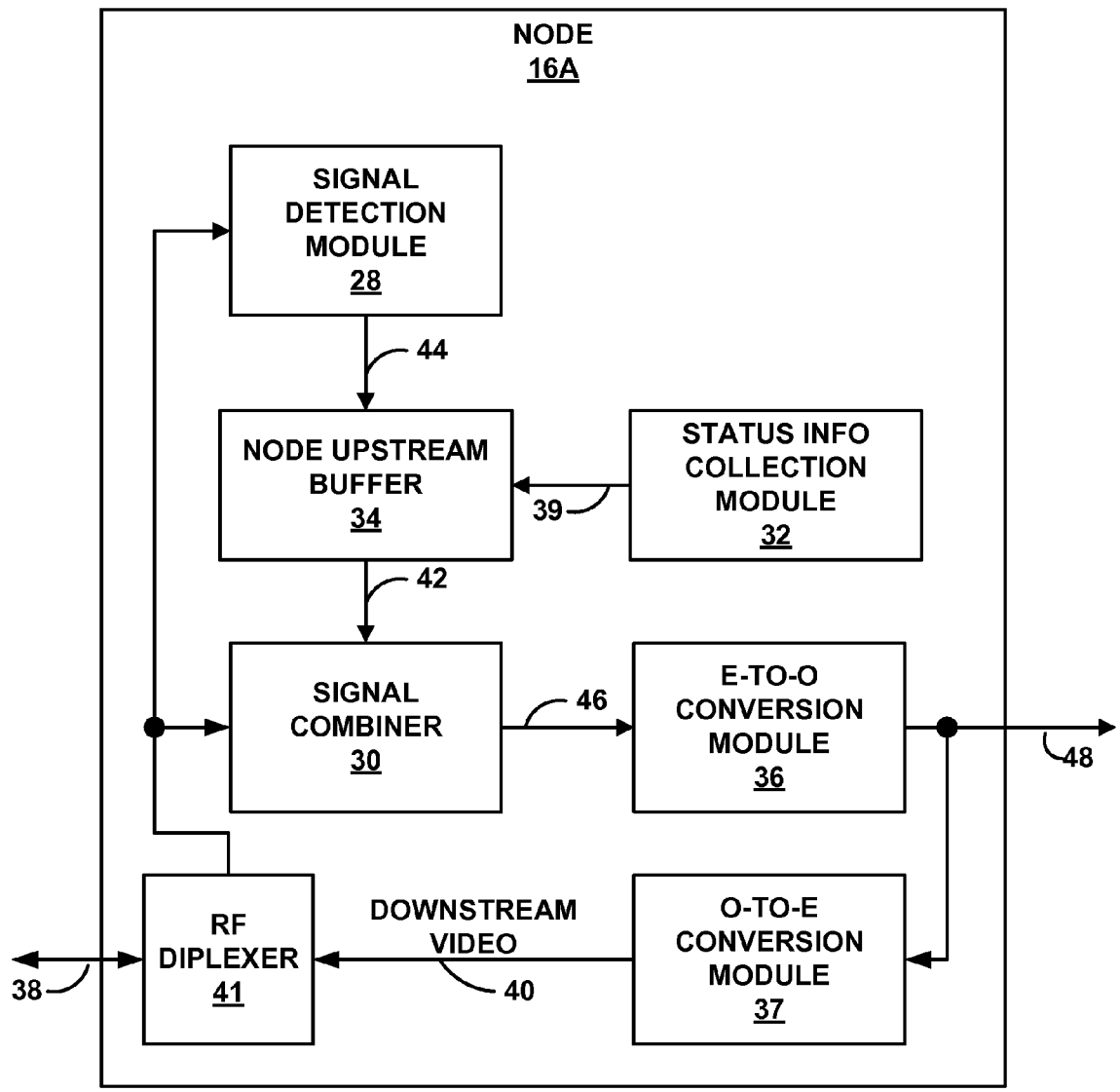
FIG. 2 is a block diagram illustrating an example node in more detail.

FIG. 2 is a block diagram illustrating an example node of FIG. 1 in more detail. While described below with respect to node 16A, each of nodes 16B-16N may include substantially similar modules, elements, components, buffers, converters and other aspects as those described below with respect to node 16A. As illustrated in FIG. 2, node 16A includes a signal detection module 28, a signal combiner 30, a status information collection module 32, a node upstream buffer 34, an optical-to-electrical conversion module 37, RF diplexer 41, and an electrical-to-optical conversion module 36 ("E-to-O conversion module 36"). The optical-to-electrical conversion module 37 provides downstream RF communication and does not necessarily need to reside in the RFOG module.

Signal combiner 30 obtains an upstream communication 38 originating from one of subscriber devices 18A-18M coupled to node 16A. The upstream communication is separated from the downstream video 40 by an RF diplexer 41. Signal combiner 30 may, for example, receive upstream communication 38 during a respective timeslot assigned to the transmitting one of subscriber devices 18A-18M or in response to a command sent by CMTS/CAS 20 to the transmitting one of subscriber devices 18A-18M. Upstream communication 38 may be an analog upstream communication, e.g., a modulated digital upstream communication or an analog test tone. Upstream communication 38 may comprise an administrative communication, control communication, configuration command, status communication or any other communication originating from subscriber devices 18 and transmitted in the upstream direction, i.e., towards central office 14. For example, a cable set-top box or modem may send upstream communications that include status information associated with the set-top box or modem or include information regarding services ordered or used by the subscriber associated with the set-top box or modem.

In one example, upstream communication 38 obtained by signal combiner 30 may be received directly from one of subscriber devices 18. In another example, node 16A may include other intermediate hardware and/or software that performs pre-processing on upstream communication 38 or otherwise handles upstream communication 38 before it arrives at signal combiner 30. For example, node 16A may includes an analog to digital (A/D) conversion module (not shown in FIG. 2) to convert an analog upstream signal received from one of subscriber devices 18 into a corresponding digital upstream signal. In one embodiment, upstream communication 38 from one of subscriber devices 18 may be in an RF signal in the frequency band between approximately 5 MHz to 42 MHz.

Signal combiner 30 also receives an upstream communication originating from node 16A. The upstream communication originating from node 16A may include status information about node 16A. Node 16A may include hardware and/or software that detects, measures or otherwise obtains status information about node 16A and generates a signal, packet or other communication that includes the status information. For example, status information collection module 32 of node 16A may monitor various components, elements or modules of node 16A to collect the status information. Status information collection module 32 may, for example, collect performance measurements for one or more components, elements or modules, such as RF power levels or optical power levels of the signals. Alternatively, or additionally, status information collection module 32 may collect other types of status information, such as a power supply level, laser aging information or other node self-test information. In one embodiment, status information collection module 32 may comprise an interrupt service routine, e.g., monitoring software, that collects the status information about node 16A.

Status information collection module 32 may generate an upstream communication 39 (e.g., signal, network data unit or other communication) that includes the collected status information. In other embodiments, status information collection module 32 may compare the collected status information to thresholds and generate upstream communication 39 when the collected status information is outside a desired range. In this manner, upstream communication 39 may function as an alarm indicating undesirable operation of node 16A. Upstream communication 39 originating from node 16A may be in a frequency band that is different than the frequency band of upstream communication 38 originating from subscriber devices 18. In one example, upstream communication 39 may be in the frequency band from approximately 43 MHz to 54 MHz. In another example, upstream communication 39 may be in the frequency band from approximately 54 to 1003 Mhz. However, the upstream signals may be within other frequency bands. The frequency bands provided above are provided strictly for purposes of illustration and therefore should not be limiting of the techniques as broadly described herein.

Upstream communication 39, which is generated by status information collection module or some other component within node 16A and that includes the collected status information or alarms may be considered to be a communication originating from node 16A. This is to be differentiated with upstream communication 38 which originates from one of subscriber devices 18. Thus, although node 16A may process upstream signal 38 to generate an optical upstream signal that includes the content of upstream signal 38, upstream signal 38 originates from subscriber devices 18, not node 16A.

Node upstream buffer 34 buffers upstream communication 39 originating from node 16A. Node upstream buffer 34 may comprise a ring or circular buffer implemented in hardware, software, or both hardware and software or any other type of buffer or storage system capable of storing fixed or variable amounts of data for delayed processing. Node upstream buffer 34 may represent a high-speed memory, such as Random Access Memory (RAM), static RAM (SRAM), dynamic RAM (DRAM) and similar highly-accessible memories, and software, e.g., a data structure, to manage at least a portion of the high-speed memory. Node upstream buffer 34 may, in one instance, comprise a First In, First Out (FIFO) buffer. A FIFO buffer operates by outputting the data in the order in which the data was received, such that a first data sample input by the FIFO buffer is also the first data sample output by the FIFO buffer. Node upstream buffer 34 may comprise a different type of buffer or other memory device that stores (buffers) at least a portion of upstream communication 39.

Signal combiner 30 combines upstream communication 38 originating from subscriber devices 18 with buffered upstream communication 42 originating from node 16A to form combined upstream signal 46. As described briefly above, upstream communication 38 originating from subscriber devices 18 and the upstream communication originating from node 16A may be in a different frequency bands such that combined upstream signal 46 may be separated into upstream communication signals 38 and 39 at central office 14. Signal combiner 30 may combine upstream communications 38 and 39 in the digital domain and/or the analog domain. In the digital domain, for example, signal combiner 30 may be an adder that performs an arithmetic addition of two digital upstream communications.

In some instances, node upstream buffer 34 may only output buffered upstream communication 42 upon receiving an enable signal 44 from signal detection module 28. As described above, node 16A is transparent to CMTS/CAS 20 and subscriber devices 18. As such, CMTS/CAS 20 does not control upstream communications from node 16A, e.g., by assigning a timeslot to node 16A or sending commands destined to node 16A to elicit a response from node 16A. Without the capability to control when node 16A transmits upstream communications originating from node 16A, the upstream communications originating and transmitted by node 16A may interfere with other upstream communications transmitted by other nodes 16, e.g., node 16N. For example, node 16N may transmit an upstream communication originating from one of its respective subscriber devices 18, e.g., during the assigned timeslot of the subscriber device that may be interfered with the upstream communication from node 16A that is sent without regards to the assigned timeslots. In other words, the two transmitting lasers of nodes 16A and 16N transmit at the same time on the same fiber, possibly resulting in optical beat interference (OBI) that renders the transmissions unintelligible. OBI occurs when light from two or more lasers sums coherently in the receiver's photodiode rather than incoherently. Typically, coherent summing happens when the lasers' wavelengths drift close to one another. In other words, OBI can occur, for example, if more than one laser included within nodes 16 transmit at a same time. OBI can introduce interference to an extent such that optical signals received by V-OLT 22 are completely unintelligible or incomprehensible. As a result, V-OLT 22 either cannot convert the upstream optical signals back into RF signals or converts the OBI resultant noise into unintelligible RF signals. Consequently, OBI may significantly disrupt, if not prevent, upstream or return path communications.

In accordance with the techniques of this disclosure, signal detection module 28 may control the time at which node 16A is permitted to send upstream communications originating from node 16A to reduce the likelihood of OBI. Signal detection module 28 may detect the presence of upstream communication 38 originating from subscriber devices 18 and assert enable signal 44 in response to detecting the upstream signal. In the example illustrated in FIG. 2, signal detection module 28 provides enable signal 44 to node upstream buffer 34 thereby only allowing node upstream buffer 34 to output buffered upstream signal 42 upon detecting upstream communication 38.

By only allowing node upstream buffer 34 to output buffered upstream communication 42 in response to enable signal 44 from signal detection module 28, signal detection module 28 essentially controls the time at which node 16A transmits upstream communications originating from node 16A. In this manner, signal detection module ensures that node 16A only transmits upstream communications originating from node 16A at the same time as upstream communications originating from subscriber devices 18, e.g., during a timeslot assigned to one of subscriber devices 18 or in response to a signal from CMTS/CAS 20 to one of subscriber devices 18. Node 16A may essentially be viewed as piggy-backing upstream communications 39 originating from node 16A onto the timeslot created for transmitting upstream communications 38 originating from subscriber devices 18.

Depending on whether upstream communication 38 is analog or digital, signal detection module 28 may perform signal detection in either the analog or digital domain, respectively. In effect, signal detection module 30 attempts to detect whether there is power on one of cables 24A-24M. In the digital domain, for example, signal detection module 28 may analyze the digital signal by comparing the digital signal to a configurable threshold. For example, signal detection module 28 may detect an upstream signal using an envelope amplitude or a power level of the upstream signal. In other embodiments, signal detection module 28 may detect an upstream signal from subscriber devices using a statically configured analog circuit, such as an RF power detector. However, digital analysis may enable node 16A to detect upstream signals more reliably because digital hardware can be programmed to adapt to specific circumstances. For example, digital analysis may enable node 16A to dynamically adapt the threshold to adjust for varying levels of noise on cables 24A-24M.

Signal combiner 30 outputs combined upstream signal 46 to E-to-O conversion module 36. E-to-O conversion module 36 converts combined upstream communication 46 to an optical signal 48 for delivery upstream to, for example, central office 14 via fiber optical cable 12. E-to-O conversion module 36 may, for example, include a laser driver and/or laser.

While not shown in FIG. 2, node 16A may include additional modules, units, elements, buffers, and other components. For example, node 16A may include additional modules, units, elements, buffers, and other components for receiving downstream optical signals, converting those optical signals into corresponding downstream signals, e.g., RF, signals, and transmitting those downstream signals to subscriber devices 18A-18M. Also not shown in FIG. 2 are various hardware and/or software required for actual receipt and transmission of signals. In this respect, FIG. 2 represents a logical diagram detailing the interaction of various modules, buffers, and other components without reference to the underlying hardware and/or software.

The various components of node 16A illustrated in FIG. 2 may be realized in hardware, software or any combination thereof. Some components may be realized as one or more processes or modules executed by one or more programmable processors, microprocessors or digital signal processors (DSPs), one or more application specific integrated circuits (ASICs), one or more field programmable gate arrays (FP- GAs), one or more Application Specific Special Processors (ASSPs) or other equivalent integrated or discrete logic circuitry. Depiction of different features as modules is intended to highlight different functional aspects of node 16A and does not necessarily imply that such modules must be realized by separate hardware or software components. Rather, functionality associated with one or more modules may be integrated within common or separate hardware or software components. Thus, the disclosure should not be limited to the example of node 16A.

Figure 3:
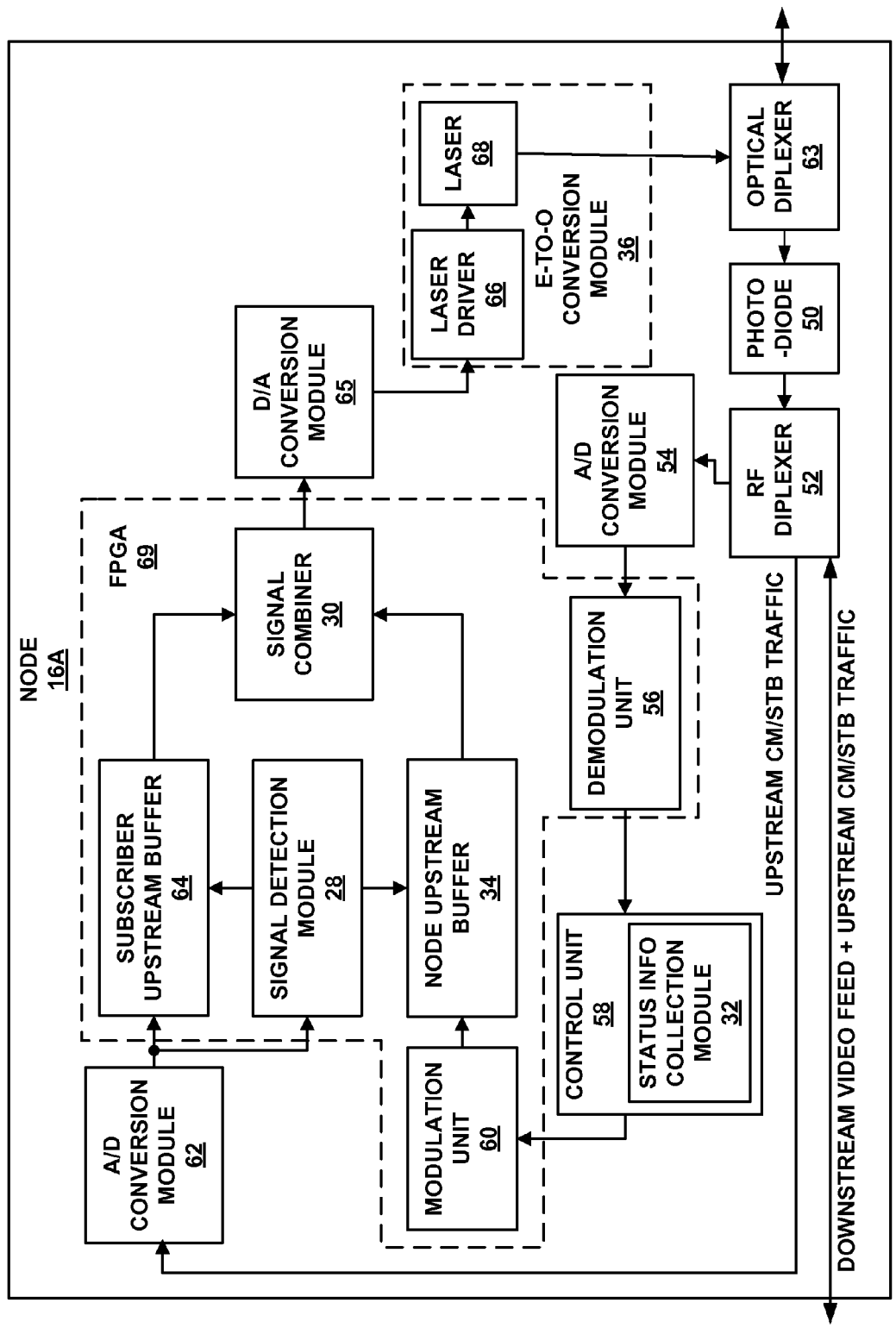
FIG. 3 is a block diagram illustrating another example node in further detail.

FIG. 3 is a block diagram illustrating node 16A of FIG. 2 in further detail. Node 16A provides a communication path for sending downstream communications, e.g., from central office 14, destined for node 16A and for transmitting upstream communications originating from node 16A to central office 14. In accordance with the techniques described in this disclosure, the communications destined for node 16A and originating from node 16A are combined with the downstream communications destined to and upstream communications received from subscriber devices 18. The communications to and from node 16A may be offset in frequency from the communication to and from subscriber devices 18.

In the downstream direction, for example, node 16A includes an optical diplexer 63 that separates the downstream wavelength from the upstream wavelength, O-to-E converter, e.g., photodiode 50 in the example of FIG. 3, that receives an optical signal from fiber optical cables 12 (FIG. 1) and converts the optical signal to an electrical signal, e.g., an RF signal. Photodiode 50 may, for example, convert light into a voltage signal or a current signal. The downstream signal may be a combined signal that includes a downstream signal destined for node 16A and a downstream signal destined for one of subscriber devices 18, e.g., offset in frequency from the downstream signal destined for node 16A.

Photodiode 50 provides the RF signal to an RF diplexer 52. RF diplexer 52 splits the downstream RF signal into two paths. In one instance, the two paths may be frequency dependent with the first path corresponding with a first frequency band and a second path corresponding with a second frequency band. The first path out of RF diplexer 52 and corresponding with the first frequency band may feed A/D conversion module 54. The second path out of RF diplexer 52 and corresponding with the second frequency band may be relayed to subscriber devices 18, e.g., via electrical cables 24 (FIG. 1). In one embodiment, the first frequency band may be from approximately 5 MHz to 42 MHz and the second frequency band may be from approximately 54 MHz to 1003 MHz. However, the upstream signals may be within other frequency bands. The frequency bands provided above are provided strictly for purposes of illustration and therefore should not be limiting of the techniques as broadly described herein.

A/D conversion module 54 may convert the RF analog signal output by RF diplexer 52 on the first path to a corresponding digital signal, e.g., according to standard, typical or conventional A/D conversion algorithms. The digital signal resulting from the A/D conversion "corresponds" to the analog signal in that it represents a digital manifestation or representation of the analog signal. A/D conversion module 54 may, for example, sample the analog signal at a particular rate to generate the corresponding digital signal. Typically, A/D conversion module 54 samples the analog signal at a rate of at least twice the frequency of the analog signal to ensure accurate representation of the analog signal as the corresponding digital signal 40.

A/D conversion module 54 provides the corresponding digital signal to demodulation unit 56. Demodulation unit 56 demodulates the digital signal to obtain a digital baseband signal. Demodulation unit 56 may, for example, include a mixer, a demodulator and a packetizer (not illustrated in FIG. 3). Demodulation unit 56 provides the digital baseband signal to a control unit 58. Control unit 58 processes the digital baseband signal to obtain information from the signal. The information may, for example, include configuration commands to configure node 16A to perform some operation, such as shut off service to a particular one of subscriber devices 18.

Control unit 58 may also monitor operation of node 16A or various elements, units, modules or other components of node 16A. To do so, control unit 58 may include a status information collection module 32 that collects status information about the various components of node 16A. The status information may be indicative of the level of performance of node 16A or components, elements, module or units of node 16A. For example, the status information may include RF power levels, optical power levels, power supply levels, laser aging information, node self-test information, or any other sort of status information regarding operation of node 16A or components of node 16A. Status information collection module 32 may, in some instances, detect or measure one or more parameters indicative of the performance of node 16A. For example, status information collection module 32 may comprise an interrupt service routine, e.g., monitoring software, that collects the status information about node 16A. In other instances, status information collection module 32 may obtain the status information from other components of node 16A. In other words, the other components may actually detect, measure or otherwise collect the status information and provide that status information to status information collection module 32.

Control unit 58 or status information collection module 32 generates an upstream communication that includes the collected status information. In this case, control unit or status information collection module 32 may generate upstream communications upon collecting status information upstream, and analysis of the status information may occur at central office 14. In other embodiments, control unit 58 or status information collection module 32 may compare the collected status information to thresholds and generate upstream communication 39 when the collected status information is outside a desired range. In this manner, upstream communication may function as an alarm indicating undesirable operation of node 16A. In other words, in this case, control unit 58 may only generate upstream communications when node 16A or a particular component of node 16A is operating outside a desired performance range.

Control unit 58 provides the upstream communication that includes the status information to modulation unit 60. Modulation unit 60 modulates the upstream communication onto a carrier signal. Modulation unit 60 may modulate the upstream communication using any of a number of modulation techniques, such a Phase Shift Keying (PSK), Frequency Shift Keying (FSK), Amplitude Shift Keying (ASK), Quadrature Amplitude Modulation (QAM) in the case of digital modulation. Modulation unit 60 may, in one example, include a packetizer, a modulator and a mixer.

Modulation unit 60 provides upstream communication 39 to node upstream buffer 34. As described above, node upstream buffer 34 buffers at least a portion of the upstream communications originating from node 16A. Node upstream buffer 34 may be configured to store up to a fixed amount of data, e.g., that corresponds with a particular duration of time. For example, node upstream buffer 34 may be configured to store the amount of data that may be transmitted during the timeslot assigned to one of subscriber devices 18.

Node 16A also receives an upstream signal from one of subscriber devices 18A-18M coupled to node 16A, e.g., during a respective timeslot assigned to the transmitting one of subscriber devices 18A-18M or in response to a command sent by CMTS/CAS 20 to the transmitting one of subscriber devices 18A-18M. The upstream communication may comprise an administrative communication, control communication, configuration command, status communication or any other communication transmitted in the upstream direction. For example, a cable set-top box or modem may send upstream RF communications that include status information associated with the set-top box or modem.

A/D conversion module 62 converts the upstream RF signal to a corresponding digital signal, e.g., according to standard, typical or conventional A/D conversion algorithms. The digital signal resulting from the A/D conversion "corresponds" to the analog signal in that it represents a digital manifestation or representation of the analog signal. A/D conversion module 62 and A/D conversion module 54 may, in some instances, be the same component. However, separate A/D conversion units are illustrated in the example of FIG. 3 to better illustrate the flow of upstream and downstream communications.

The corresponding digital signal from A/D conversion module 62 is provided to subscriber upstream buffer 64 and signal detection module 28. Subscriber upstream buffer 64 stores a configured amount of the digital signal output by A/D conversion module 62. Subscriber upstream buffer 64 may be configured to store a particular amount of the digital signal that corresponds with a particular duration of time. As one example, subscriber upstream buffer 64 may be configured to store the amount of data that corresponds with the amount of time it takes signal detection module 28 to detect the upstream communication, e.g., approximately 4 microseconds (μs) as described in detail below. Subscriber upstream buffer 64 may therefore reduce the likelihood of losing data during detection of the upstream signal. The amount of data buffered or stored by subscriber upstream buffer 64 may be different than the amount of data buffered by node upstream buffer 34. This is due to the fact that node upstream buffer 34 typically buffers or stores entire communications (e.g., data to fill an entire timeslot) whereas subscriber upstream buffer 64 buffers or stores only a portion of the upstream communication from subscriber devices (e.g., the portion of the communication that corresponds with the detection time of signal detection module 28). The delay of subscriber upstream buffer 64 will be described in more detail below.

Signal detection module 28 detects the presence of an upstream communication from one of subscriber devices 18. In the digital domain, signal detection module 28 may analyze the digital signal by comparing the digital signal to a configurable threshold. For example, signal detection module 28 may detect an upstream signal by comparing an envelope amplitude or power level of the upstream signal to a threshold envelope amplitude or power level. In other embodiments, signal detection module 28 may detect an upstream signal from subscriber devices using a statically configured analog circuit, such as an RF power detector. However, digital analysis may enable node 16A to detect upstream signals more reliably because digital hardware can be programmed to adapt to specific circumstances. For example, digital analysis may enable node 16A to dynamically adapt the threshold to adjust for varying levels of noise on cables 24.

In response to detecting an upstream signal from one of subscriber devices 18, signal detection module 28 asserts an enable signal. In the example illustrated in FIG. 3, signal detection module 28 provides enable signals to subscriber upstream buffer 64 and node upstream buffer 34. Subscriber upstream buffer 64 and node upstream buffer 34 begin to output the content stored in the respective buffers to signal combiner 30 in response to the enable signals received from signal detection module 28. Note that the transmit frequencies of the received upstream data and the node status information will be different to ensure that the information from both sources can be reliably received. To sum the signals from the two sources with different frequencies will require that sample rates of the two streams be equalized. This can be done using standard interpolation and decimation algorithms which are well known to those skilled in the art.

As described above, by only allowing node upstream buffer 34 to output buffered upstream communication 42 in response to enable signal 44 from signal detection module 28, signal detection module 28 may control the time at which node 16A transmits upstream communications originating from node 16A. In this manner, signal detection module 28 ensures that node 16A only transmits upstream communications originating from node 16A at the same time as upstream communications originating from subscriber devices 18, e.g., during a timeslot assigned to one of subscriber devices 18 or in response to a signal from CMTS/CAS 20 to one of subscriber devices 18. Node 16A may essentially be viewed as piggy-backing upstream communications 39 originating from node 16A onto the timeslot created for transmitting upstream communications 38 originating from subscriber devices 18.

Signal combiner 30 combines the buffered upstream communication from subscriber upstream buffer 64 with the buffered upstream communication from node upstream buffer 34 to form the combined upstream signal. In other words, signal combiner combines the upstream communication originating from one of the subscriber devices 18 with the upstream communication originating from node 16A. Signal combiner 30 may, for example, comprise an adder that performs an arithmetic addition of the two digital upstream communications buffered by buffers 34 and 64. As described above, the upstream communication originating from one of subscriber devices 18 and the upstream communication originating from node 16A may be in different frequency bands. In one example, the upstream communication originating from the subscriber devices 18 may be within the frequency band from approximately 5 MHz to 42 MHz and the upstream communication originating from node 16A may be within the frequency band from approximately 54 to 1003 MHz. However, the upstream signals may be within other frequency bands. The frequency bands provided above are provided strictly for purposes of illustration and therefore should not be limiting of the techniques as broadly described herein.

Signal combiner 30 provides the combined upstream signal to D/A conversion module 65. D/A conversion module 65 converts the combined upstream signal from the digital domain to the analog domain. D/A conversion module 65 may, for example, convert the digital signal to an analog signal via any of the standard D/A conversion method, e.g., successive approximation. A single DSP may be used to implement A/D conversion module 62, A/D conversion module 54 an D/A conversion module 65.

E-to-O conversion module 36 converts upstream analog signals received from one or more subscriber devices, e.g., subscriber devices 18A-18M, to optical signals for delivery upstream to, for example, central office 14 via fiber optical cable 12. In the example illustrated in FIG. 3, E-to-O conversion module 36 includes a laser driver 66 and a laser 68. Laser driver 66 receives the combined analog upstream signal from D/A conversion module 65 and uses the combined analog signal to drive laser 68.

The various components of node 16A illustrated in FIG. 2 may be realized in hardware, software or any combination thereof. Some components may be realized as one or more processes or modules executed by one or more programmable processors, microprocessors or DSPs, ASICs, FPGAs, ASSPs or other equivalent integrated or discrete logic circuitry. In the example embodiment illustrated in FIG. 3, modulation unit 60, demodulation unit 56, buffers 34 and 64, signal detection module 28 and signal combiner 30 are be implemented within a single FPGA 69. However, the techniques of this disclosure should not be limited to such an embodiment. Instead, depiction of different features as modules is intended to highlight different functional aspects of node 16A and does not necessarily imply that such modules must be realized by separate hardware or software components. Rather, functionality associated with one or more modules may be integrated within common or separate hardware or software components.

Buffering upstream communications originating from subscriber devices 18 may also provide a number of other advantages, e.g., as described in commonly-assigned U.S. patent application Ser. No. 12/260,665 by Mark R. Biegert et al., entitled "RETURN PATH COMPLIANCE IN NETWORKS", filed on the same date as the present disclosure, and incorporated herein by reference in its entirety. In particular, buffering upstream communications may reduce or eliminate a potential conflict arising between the analog RFOG implementations and the standards governing HFC networks, as the return path rate provided in the HFC DOCSIS 3.0 standard greatly exceeds the return path rate provided in the DOCSIS 1.0, 1.1, 2.0, ANSI/SCTE 55-1 and 55-2 standards. As a result, networks containing analog RFOG hardware that complied with the ANSI/SCTE 55-1 and 55-2 standards may not be upgradable to the newer DOCSIS 3.0 standard. These analog RFOG return paths may only be able to support a return path rate of 128 Ksym/s instead of the DOCSIS 3.0 compliant return path rate of 5.12 Msym/s.

The failure of analog RFOG return path hardware to comply with the higher return path rates specified in DOCSIS 3.0 may significantly curtail the adoption of RFOG networks as an intermediate step to full optical networks, as service providers who deploy RFOG networks may not be able to offer those higher upstream or return path rates specified in the DOCSIS 3.0 standard. Those service providers already operating DOCSIS 3.0 compliant networks may entirely avoid RFOG networks, as ONTs failing to support the return path rate specified in DOCSIS 3.0 may limit if not entirely prevent upstream communications from occurring. This second scenario, where the ONT prevents upstream communications, may significantly limit if not prevent RFOG networks from providing Internet, VoIP and other interactive, two-way, or upstream-reliant services. The second scenario arises because of two phenomena, clipping and "optical beat interference" or "OBI" for short.

Clipping may occur when the RFOG hardware does not faithfully reproduce all the information contained in the upstream analog system. Clipping occurs because the RFOG unit takes time to determine the presence of the upstream analog transmission and during this time some information will not be transmitted upstream and will therefore be lost. Clipping is a problem that occurs at the beginning of an upstream transmission. Similarly, if the RFOG hardware does not stop transmitting at the same time as the upstream RF transmission ends, there is the possibility that the lasers from two RFOG units be transmitting at the same time. When two lasers transmit at the same time on the same fiber, OBI can occur and may render the transmission unintelligible. OBI occurs when light from two or more lasers sums coherently in the receiver's photodiode rather than incoherently. Typically, coherent summing happens when the lasers' wavelengths drift close to one another. In other words, OBI can occur, for example, if more than one laser included within nodes 16 begins transmitting at a same time.

OBI occurs in the second scenario as a result of a failure of conventional nodes to quickly detect the end of upstream or return path communications and/or adjust for the time required to detect upstream or return path communications. CMTS/CAS 20, as mentioned above, assigns timeslots to each of subscriber devices 18 during which the respective subscriber devices 18 may communicate upstream.

Generally, conventional nodes require about 4 µs to detect a return path signal (e.g., determine if an upstream RF signal is valid), as the first few microseconds of any RF upstream signal may not be properly distinguishable from noise. This is because the upstream RF signal may have a slow rise time and the detection hardware has unavoidable internal delays. In networks complying with the slower 128 Ksym/s return path rate, there is sufficient time for the conventional nodes to detect the signal, turn on the laser, transmit the optical signal with insignificant clipping and turn off the laser before another laser turned on. In networks complying with the higher 5.12 Msym/s return path rate, however, these conventional nodes may detect the signal and turn on the laser, but not turn off the laser before another node begins transmitting, thereby causing OBI.

Moreover, in those networks complying with the higher 5.12 Msym/s return path rate, the conventional nodes, as a result of the increased rate and 4 µs time to detect an upstream RF signal, may lose data irretrievably when deployed in these networks. Again, referring to the networks adopting the slower 128 Ksym/s return path rate for purposes of illustration, the time to communicate each symbol ($T_{Symbol(SCTE)}$) is approximately 7.8125 µs, which is greater than the time to detect the RF signal or 4 µs. Because the 4 µs delay is much shorter than a symbol at this symbol rate, generally, only an insignificant fraction of a single clock cycle is lost when using an unbuffered approach. However, as symbol rates increase, as is the case in DOCSIS 3.0, this 4 µs delay will consume a larger portion of the first symbol. In fact, at the highest rates a number of the leading symbols will be lost and will cause irretrievable loss of data or clipping of the upstream RF transmission. Similar effects occur when an upstream transmission must end. The laser must also be turned off quickly enough to ensure that two lasers cannot be on simultaneously and avoid OBI.

The DOCSIS standard allows 5 symbol times for turn-off time or ~1 µs at $5/23$ Msym/s (the maximum return path rate). Thus, the 4 µs detection time is not sufficient to meet the turn-off requirement either. Thus, in networks compliant with the higher return path rate of 5.12 Msym/s, for example, the time or period these networks require to transmit a symbol ($T_{Symbol(DOCSIS)}$) is approximately 0.195313 µs, which is far less than the 4 µs time required by a conventional nodes to detect a symbol. Buffering the upstream communication originating from subscriber devices 18 while signal detection module 28 performs the signal detection may reduce, if not eliminate, the occurrence of both of the above described issues. By buffering these upstream RF signals, nodes 16 may each introduce a slight delay into RFOG network 10 equivalent to or exceeding the delay typically required by nodes 16 to detect the upstream RF signals, e.g., 4 µs. In effect, this delay is introduced or factored into RF network 10 during a process known as "ranging," which is used to assign upstream transmission timeslots to subscriber devices 18, as described in further detail in commonly-assigned U.S. patent application Ser. No. 12/260,665 by Mark R. Biegert et al., entitled "RETURN PATH COMPLIANCE IN NETWORKS".

Figure 4:
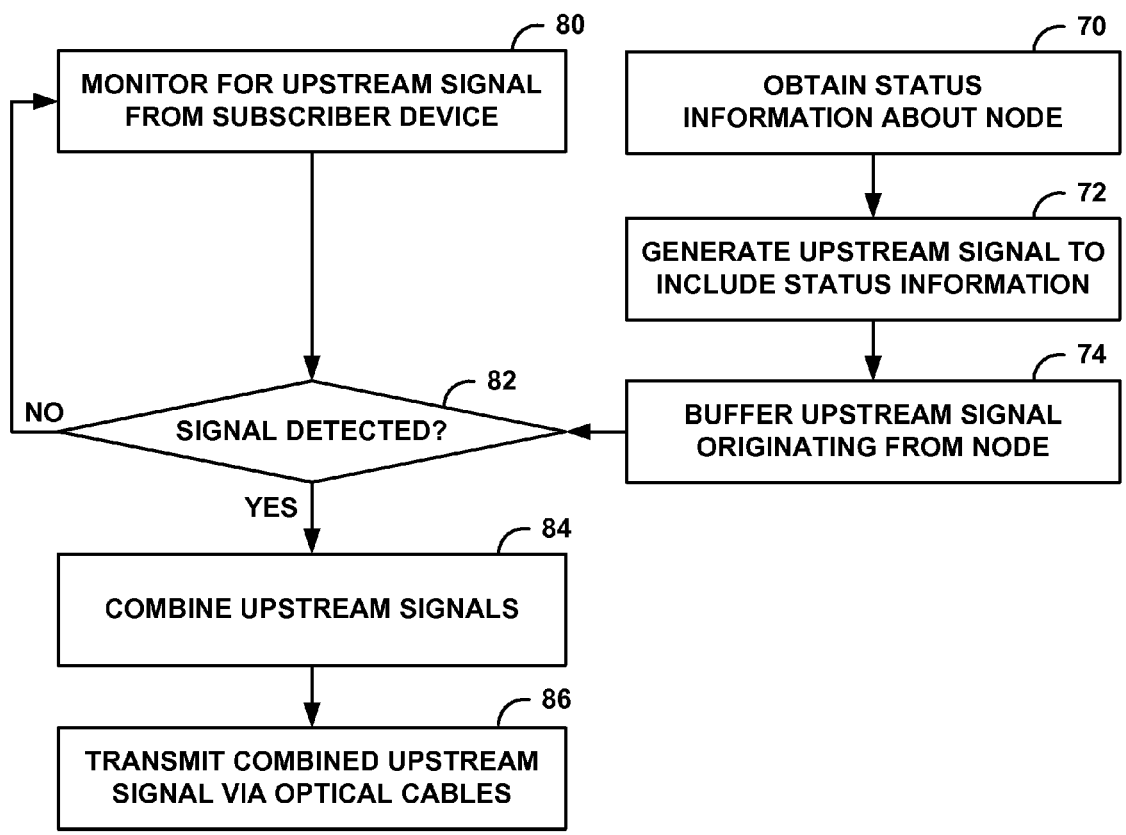
FIG. 4 is a flow diagram illustrating an example operation of a node of an optical network performing the upstream return techniques of this disclosure.

FIG. 4 is a flow diagram illustrating an example operation of a node, e.g., node 16A, of an optical network combining upstream communications in accordance with the techniques of this disclosure. Node 16A obtains status information about one or more components of node 16A (70). Node 16A may include a status information collection module 32 that detects, measures or otherwise obtains status information about node 16A. The status information about the node may, for example, include data associated with performance measurements for one or more components, elements or modules, such as RF power levels or optical power levels of the signals. Alternatively, or additionally, status information collection module 32 may collect other types of status information, such as a power supply level, laser aging information or other node self-test information.

Node 16A may generate an upstream communication that includes the collected status information (72). Node 16A buffers the generated upstream communication, i.e., the communication originating from node 16A (74). Node 16A may buffer the upstream communication in node upstream buffer 34, which may comprise a ring buffer, circular buffer or any other type of buffer or storage system capable of storing fixed or variable amounts of data for delayed processing. The node upstream buffer 34 may be configured to buffer an amount of data that is equivalent to the amount of data that may be transmitted upstream a timeslot assigned to one of subscriber devices 18.

Signal detection module 28 of node 16A monitors for an upstream communication from one of subscriber devices 18A-18M (80). Node 16A may, for example, receive the upstream communication during a respective timeslot assigned to the transmitting one of subscriber devices 18A-18M or in response to a command sent by CMTS/CAS 20 to elicit a response from one of subscriber devices 18A-18M. The upstream communication may be an analog communication or a digital communication.

Signal detection module 28 determines whether the upstream signal is detected (82). Depending on whether the upstream communication from subscriber device 18 is analog or digital, signal detection module 28 may perform signal detection in either the analog or digital domain, respectively. In the digital domain, for example, signal detection module 28 may analyze the digital signal by comparing the digital signal to a configurable threshold. In other embodiments, signal detection module 28 may detect an upstream signal from subscriber devices using a statically configured analog circuit, such as an RF power detector. However, digital analysis may enable node 16A to detect upstream signals more reliably because digital hardware can be programmed to adapt to specific circumstances. For example, digital analysis may enable node 16A to dynamically adapt the threshold to adjust for varying levels of noise on cables 24A-24M.

When no upstream communication is detected ("NO" branch of block 82), node 16A continues to monitor for an upstream communication originating from one of subscriber devices 18A-18M. When signal detection module 28 detects an upstream communication ("YES" branch of block 82), signal combiner 30 combines the upstream signal originating from the transmitting one of subscriber devices 18 and the buffered upstream signal originating from node 16A (84). Signal combiner 30 may combine the upstream communications in the digital domain and/or the analog domain. In the digital domain, for example, signal combiner 30 may be an adder that performs an arithmetic addition of two digital upstream communications. As described above, the upstream communication originating from subscriber devices 18 and the upstream communication originating from node 16A may be in a different frequency bands such that combined upstream signal 46 may be separated at central office 14. Node 16A may essentially be viewed as piggy-backing its upstream communications onto the timeslot created for transmitting the upstream communications originating from subscriber devices 18.

Node 16A transmits the combined upstream communication as an optical signal via fiber optical cable 12 (86). Signal combiner 30 may, for example, output the combined upstream signal to an E-to-O conversion module 36. The E-to-O conversion module 36 may, for example, include a laser driver 66 and/or laser 68.

Figure 5:
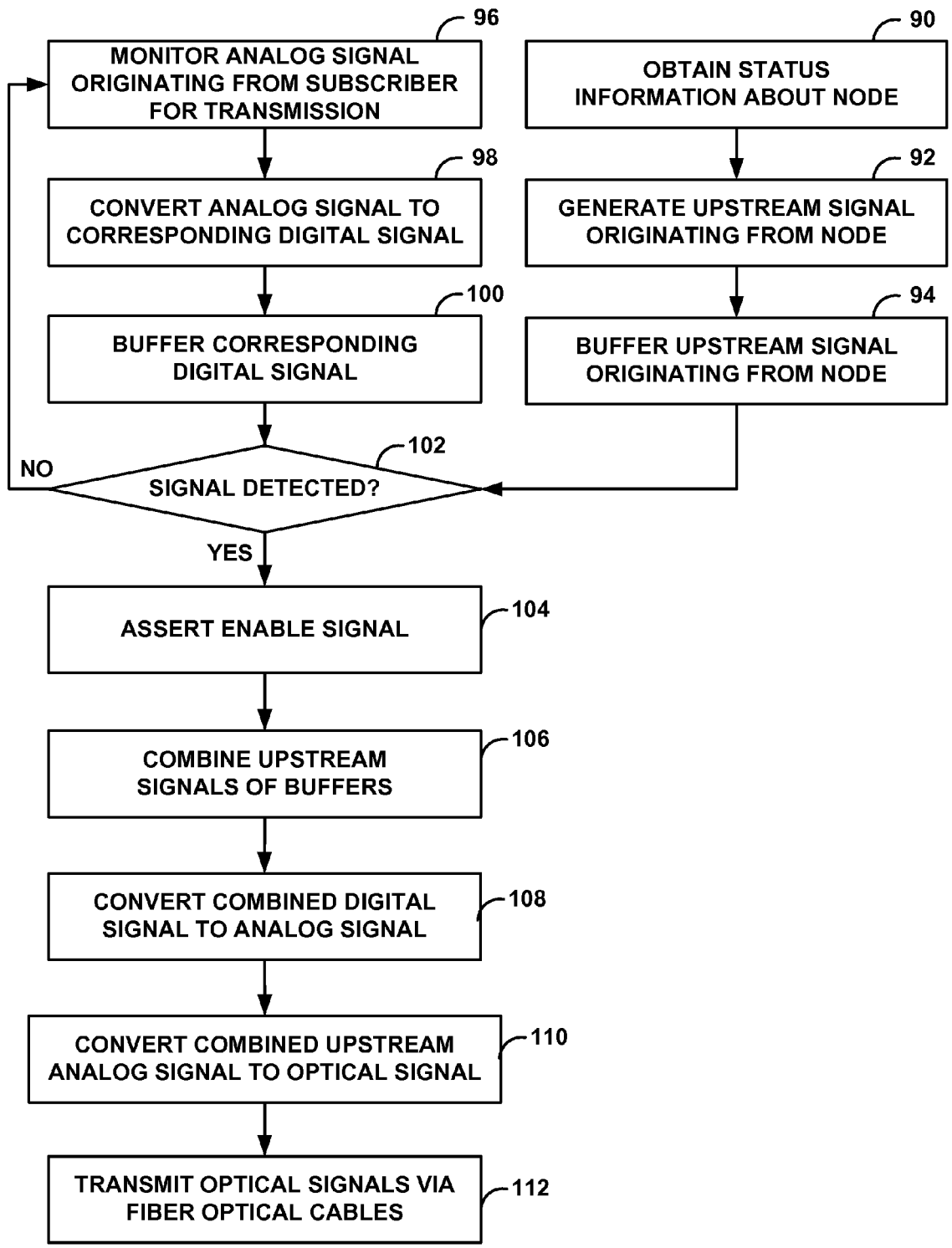
FIG. 5 is a flow diagram illustrating another example operation of a node of an optical network performing the upstream return techniques of this disclosure.

FIG. 5 is a flow diagram illustrating another example operation of a node of an optical network combining upstream communications in accordance with the techniques of this disclosure. Node 16A obtains status information about one or more components of node 16A (90). Node 16A may include a status information collection module 32 that detects, measures or otherwise obtains status information about node 16A, such as RF power levels, optical power levels, laser aging information, node self-test information, or alarms.

Node 16A may generate an upstream communication that includes the collected status information (92). Node 16A buffers the generated upstream communication, i.e., the communication originating from node 16A (94). Node upstream buffer 34 may be configured to buffer an amount of data that is equivalent to the amount of data that may be transmitted upstream a timeslot assigned to one of subscriber devices 18.

Node 16A may receive an upstream communication originating from one of subscriber devices 18A-18M coupled to node 16A (96). Node 16A may, for example, receive an upstream RF signal from one of subscriber devices 18A-18M during a respective timeslot assigned to the transmitting one of subscriber devices 18A-18M or in response to a command sent by CMTS/CAS 20 to elicit a response from one of subscriber devices 18A-18M.

A/D conversion module 62 converts the upstream RF signal to a corresponding digital signal (98). Subscriber upstream buffer 64 buffers at least a portion of the corresponding digital signal (100). Subscriber upstream buffer 63 may, for example, be configured to buffer a particular amount of the digital signal that corresponds with a particular duration of time. As one example, subscriber upstream buffer 64 may be configured to store the amount of data that corresponds with the amount of time it takes signal detection module 28 to detect the upstream communication, e.g., approximately 4 microseconds (µs) as described in detail below.

Concurrently with the buffering of the portion of the signal, signal detection module 28 determines whether the upstream signal is detected (102). For example, signal detection module 28 may compare a power level of the digital signal to a threshold level and detect the upstream signal when the power level of the digital signal exceeds the threshold power level. When no upstream communication is detected ("NO" branch of block 102), node 16A continues to monitor for an upstream communication originating from one of subscriber devices 18A-18M.

When signal detection module 28 detects an upstream communication ("YES" branch of block 102), signal detection module 28 asserts an enable signal (104). Signal detection module 28 may, for example, provide the enable signal to subscriber upstream buffer 64 and node upstream buffer 34 to cause the buffers to begin to output the content stored in the respective buffers to signal combiner 30. Signal combiner 30 combines the buffered upstream signals output by buffers 34 and 64 to generate a combined upstream signal (106). For example, signal combiner 30 may be an adder that performs an arithmetic addition of the two digital upstream communications buffered in buffers 34 and 64.

D/A conversion module 65 converts the combined upstream signal from the digital domain to the analog domain (108). E-to-O conversion module 36 converts analog combined upstream communication to one or more optical signals (110). Node 16A transmits the one or more optical signals via fiber optical cable 12 (112).

By only allowing outputting data from buffers 34 and 64 in response to the enable signal from signal detection module 28, signal detection module 28 essentially controls the time at which node 16A transmits upstream communications originating from node 16A. Thus, signal detection module 28 ensures that node 16A only transmits the upstream communication originating from node 16A at the same time as upstream communications originating from subscriber devices 18, e.g., during a timeslot assigned to one of subscriber devices 18 or in response to a signal from CMTS/CAS 20 to one of subscriber devices 18.

The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. If implemented in hardware, this disclosure may be directed to an apparatus such a processor or an integrated circuit device, such as an integrated circuit chip or chipset. Alternatively or additionally, if implemented in software, the techniques may be realized at least in part by a computer-readable medium comprising instructions that, when executed, cause a processor to perform one or more of the methods described above. For example, the computer-readable medium may store such instructions.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules.

Various embodiments have been described. These and other embodiments are within the scope of the following claims.

The invention claimed is:

1. A method comprising:
receiving, with a node of an optical network, a first upstream communication originating from a subscriber device coupled to the node, wherein the first upstream communication comprises an upstream radio frequency (RF) communication, and wherein the optical network comprises a radio frequency over glass (RFOG) network;
responsive to receiving the first upstream communication, combining, with the node, the first upstream communication received from the subscriber device with a second upstream communication originating from the node to generate a combined upstream communication for an optical line terminal (OLT) positioned between the node and a headend system, wherein the combined upstream communication is separable at the OLT such that the headend system cannot detect that the first upstream communication has been combined with the second upstream communication;
transparently converting, with the node, the combined upstream communication to an upstream optical signal; and
transmitting, with the node, during a timeslot assigned to the subscriber device to communicate the first upstream communication to the headend system, the upstream optical signal via a fiber optical cable included within the RFOG network to the OLT for separation of the second upstream communication from the combined upstream communication.

2. The method of claim 1, further comprising:
obtaining status information about at least one component of the node;
generating, with the node, the second upstream communication to include the collected status information; and
buffering the second upstream communication.

3. The method of claim 2, wherein the collected status information includes at least one of laser aging data, a power supply level, a radio frequency (RF) power level, a optical power level, node self-test data, and an alarm indicating undesirable operation of the node.

4. The method of claim 1, further comprising:
detecting the first upstream communication originating from the subscriber device;
buffering at least a portion of the first upstream communication while detecting the first upstream communication; and
combining the first upstream communication originating from the subscriber device with the second upstream communication originating from the node in response to detecting the first upstream communication.

5. The method of claim 4, wherein buffering at least a portion of the first upstream communication comprises buffering at least the portion of the first upstream communication that corresponds with an amount of time needed to detect the first upstream communication.

6. The method of claim 4, wherein detecting the first upstream communication comprises:
comparing a power level of the first upstream communication to a threshold power level; and
detecting the first upstream communication when the power level of the first upstream communication equals or exceeds the threshold power level.

7. The method of claim 1, wherein the first upstream communication originating from the subscriber device is in a first frequency band and the second upstream communication originating from the node is in a second frequency band that is different than the first frequency band.

8. The method of claim 1, wherein receiving the first upstream communication originating from the subscriber device comprises receiving the first upstream communication in response to a command from the headend system designed to elicit a response from the subscriber device.

9. The method of claim 8, further comprising:
transmitting, with the node, a request to the headend system to elicit the response from the subscriber device, wherein the command from the headend system designed to elicit the response from the subscriber device is in response to the request.

10. The method of claim 1, further comprising:
receiving a downstream optical signal via the fiber optical cable, wherein the downstream optical signal includes a first downstream communication destined for the node and a second downstream communication directed to the subscriber device;
separating the downstream optical signal into the first downstream communication destined for the node and the second downstream communication directed to the subscriber device;
processing the first downstream communication with the node; and
relaying the second downstream communication to the subscriber device.

11. The method of claim 1,
wherein combining the first upstream communication received from the subscriber device with the second upstream communication originating from the node comprises:
converting the upstream RF communication from an analog domain to a digital domain so as to generate a corresponding upstream digital communication; and
combining the upstream digital communication and the second upstream communication in the digital domain to generate a combined digital upstream communication, and
wherein transparently converting the combined upstream communication comprises transparently converting the combined digital upstream communication to the upstream optical signal.

12. A device of an optical network comprising:
a signal combiner that, in response to receiving a first upstream communication from a subscriber device to which the device is coupled, transparently combines the first upstream communication with a second upstream communication originating from the device to generate a combined upstream communication for an optical line terminal (OLT) positioned between the device and a headend system, wherein the combined upstream communication is separable at the OLT such that the headend system cannot detect that the first upstream communication has been combined with the second upstream communication, wherein the first upstream communication comprises an upstream radio frequency (RF) communication, wherein the optical network comprises a radio frequency over glass (RFOG) network; and
an electrical-to-optical conversion module that transparently converts the combined upstream communication to an upstream optical signal,
wherein the electrical-to-optical conversion module includes a laser that transmits, during a timeslot assigned to the subscriber device to communicate the first upstream communication to the headend system, the combined upstream communication as the upstream optical signal via a fiber optical cable included within the RFOG network to the OLT for separation of the second upstream communication from the combined upstream communication.

13. The device of claim 12, further comprising:
a status information collection module that obtains status information about at least one component of the device and generates the second upstream communication to include the collected status information; and
a buffer to buffer the second upstream communication.

14. The device of claim 13, wherein the collected status information includes at least one of laser aging data, a power supply level, a radio frequency (RF) power level, a optical power level, device self-test data, and an alarm indicating undesirable operation of the device.

15. The device of claim 12, further comprising:
a signal detection module that detects the first upstream communication originating from the subscriber device, wherein the signal combiner combines the first upstream communication originating from the subscriber device with the second upstream communication originating from the device in response to detecting the first upstream communication; and
a buffer to buffer at least a portion of the first upstream communication while detecting the first upstream communication.

16. The device of claim 15, wherein the buffer buffers at least the portion of the first upstream communication that corresponds with an amount of time needed to detect the first upstream communication.

17. The device of claim 15, wherein the signal detection module compares a power level of the first upstream communication to a threshold power level and detects the first upstream communication when the power level of the first upstream communication equals or exceeds the threshold power level.

18. The device of claim 12, wherein the first upstream communication originating from the subscriber device is in a first frequency band and the second upstream communication originating from the device is in a second frequency band that is different than the first frequency band.

19. The device of claim 12, wherein the device receives the first upstream communication originating from the subscriber device in response to a command from the headend system designed to elicit a response from the subscriber device.

20. The device of claim 19, wherein the command from the headend system designed to elicit the response from the subscriber device is sent from the headend system in response to a request from the device to elicit the response from the subscriber device.

21. The device of claim 12, further comprising:
a photodiode to receive a downstream optical signal via the fiber optical cable, wherein the downstream optical signal includes a first downstream communication destined for the device and a second downstream communication directed to the subscriber device;
a diplexer to separate the downstream optical signal into the first downstream communication destined for the device and the second downstream communication directed to the subscriber device; and
a control unit to process the first downstream communication;

wherein the device relays the second downstream communication to the subscriber device.

22. The device of claim 12, further comprising an analog-to-digital (A/D) conversion module that converts the upstream RF communication from an analog domain to a digital domain so as to generate a corresponding upstream digital communication,
wherein the signal combiner combines the upstream digital communication and second upstream communications in the digital domain to generate a combined digital upstream communication, and
wherein the electrical-to-optical conversion module further transparently converts the combined digital upstream communication to the upstream optical signal.

23. The device of claim 12, wherein the device comprises one of a full node, a mininode, and a micronode.

24. The device of claim 12, wherein the node is incorporated within an Optical Network Terminal (ONT).

25. A device of an optical network comprising:
means for receiving a first upstream communication originating from a subscriber device coupled to the node, wherein the first upstream communication comprises an upstream radio frequency (RF) communication, wherein the optical network comprises a radio frequency over glass (RFOG) network;
means, responsive to receiving the first upstream communication, for combining the upstream communication received from the subscriber device with a second upstream communication originating from the device to generate a combined upstream communication for an optical line terminal (OLT) positioned between the node and a headend system, wherein the combined upstream communication is separable at the OLT such that the headend system cannot detect that the first upstream communication has been combined with the second upstream communication; and
means for transparently converting the combined upstream communication to an upstream optical signal;
means for transmitting, during a timeslot assigned to the subscriber device to communicate the first upstream communication to the headend system, the combined upstream communication as the upstream optical signal via a fiber optical cable included within the RFOG network to the OLT for separation of the second upstream communication from the combined upstream communication.

26. The device of claim 25, further comprising:
means for obtaining status information about at least one component of the device;
means for generating the second upstream communication to include the collected status information; and
means for buffering the second upstream communication.

27. The device of claim 26, wherein the collected status information includes at least one of laser aging data, a power supply level, a radio frequency (RF) power level, a optical power level, device self-test data, and an alarm indicating undesirable operation of the device.

28. The device of claim 25, further comprising:
means for detecting the first upstream communication originating from the subscriber device; and
means for buffering at least a portion of the first upstream communication while detecting the first upstream communication,
wherein the combining means combines the first upstream communication originating from the subscriber device with the second upstream communication originating from the device in response to detecting the first upstream communication.

29. The device of claim 28, wherein the buffering means buffers at least the portion of the first upstream communication that corresponds with an amount of time needed to detect the first upstream communication.

30. The device of claim 28, wherein the detecting means compares a power level of the first upstream communication to a threshold power level and detects the first upstream communication when the power level of the first upstream communication equals or exceeds the threshold power level.

31. The device of claim 25, wherein the first upstream communication originating from the subscriber device is in a first frequency band and the second upstream communication originating from the device is in a second frequency band that is different than the first frequency band.

32. The device of claim 25, wherein the receiving means receives the first upstream communication originating from the subscriber device in response to a command from the headend system designed to elicit a response from the subscriber device.

33. The device of claim 32, further comprising:
means for transmitting a request to the subscriber device to elicit the response from the subscriber device, wherein the command from the headend system designed to elicit the response from the subscriber device is in response to the request.

34. The device of claim 25, further comprising:
means for receiving a downstream optical signal via the fiber optical cable, wherein the downstream optical signal includes a first downstream communication destined for the device and a second downstream communication directed to the subscriber device;
means for separating the downstream optical signal into the first downstream communication destined for the device and the second downstream communication directed to the subscriber device;
means for processing the first downstream communication with the device; and
means for relaying the second downstream communication to the subscriber device.

35. The device of claim 25, further comprising means for converting the upstream RF communication from an analog domain to a digital domain so as to generate a corresponding upstream digital communication,
wherein the combining means combines the upstream digital communication and the second upstream communications in the digital domain to generate a combined digital upstream communication
wherein the means for transparently converting the combined upstream communication comprises means for transparently converting the combined digital upstream communication to the upstream optical signal.

36. A computer-readable medium comprising instructions that cause a programmable processor to:
receive, with a node of an optical network, a first upstream communication originating from a subscriber device coupled to the node, wherein the first upstream communication comprises an upstream radio frequency (RF) communication, and wherein the optical network comprises a radio frequency over glass (RFOG) network;
responsive to receiving the first upstream communication, combine, with the node, the first upstream communication received from the subscriber device with a second upstream communication originating from the node to generate a combined upstream communication for an optical line terminal (OLT) positioned between the node and a headend system, wherein the combined upstream communication is separable at the OLT such that the headend system cannot detect that the first upstream communication has been combined with the second upstream communication;

transparently convert, with the node, the combined upstream communication to an upstream optical signal; and transmit, with the node, during a timeslot assigned to the subscriber device to communicate the first upstream communication to the headend system, the upstream optical signal via a fiber optical cable included within the RFOG network to the OLT for separation of the first upstream communication from the combined upstream communication.

37. The computer-readable medium of claim 36, further comprising instructions that cause a programmable processor to:

obtain status information about at least one component of the node;

generate, with the node, the second upstream communication to include the collected status information; and buffer the second upstream communication.

38. The computer-readable medium of claim 36, further comprising instructions that cause a programmable processor to:

detect the first upstream communication originating from the subscriber device;

buffer at least a portion of the first upstream communication while detecting the first upstream communication; and combine the first upstream communication originating from the subscriber device with the second upstream communication originating from the node in response to detecting the first upstream communication.

39. The computer-readable medium of claim 36, wherein the first upstream communication originating from the subscriber device is received in response to a command from the headend system designed to elicit a response from the subscriber device.

* * * * *

UNITED STATES PATENT AND TRADEMARK OFFICE
CERTIFICATE OF CORRECTION

PATENT NO. : 8,428,465 B2  
APPLICATION NO. : 12/260690  
DATED : April 23, 2013  
INVENTOR(S) : Mark R. Biefert and Peter O. Lee Page 1 of 1

It is certified that error appears in the above-identified patent and that said Letters Patent is hereby corrected as shown below:

Title page, Item (54) and in the Specification, column 1, line 1-2, should read -- RETURN PATH FOR UPSTREAM COMMUNICATIONS ORIGINATING FROM OPTICAL NODE --

Specification

On column 2, line 8 "upgrade the CMTS," should read -- upgrade the CMTSs, --

On column 7, line 43 "and notify an network" should read -- and notify a network --

On column 9, line 11 "CMCv3.0," should read -- CMCIv3.0, --

On column 9, line 15 "." should read -- , --

On column 10, line 5 "may includes" should read -- may include --

On column 14, line 56 "such a Phase" should read -- such as Phase --

On column 16, line 61 "an D/A" should read -- and D/A --

Claims

On column 23, line 49, Claim 12 "coupled, transparently combines" should read -- coupled, combines --

Signed and Sealed this  
Third Day of November, 2015

Michelle K. Lee  
*Director of the United States Patent and Trademark Office*